United States Patent [19]
Budraitis

[11] 3,858,440
[45] Jan. 7, 1975

[54] STRESS TRANSDUCER MOUNTING AND METHOD OF ADJUSTMENT

[75] Inventor: Tadas Budraitis, Midlothian, Ill.

[73] Assignee: Productronix, Inc., Oak Forest, Ill.

[22] Filed: Nov. 29, 1972

[21] Appl. No.: 310,403

[52] U.S. Cl. .................. 73/88.5 R, 73/DIG. 4
[51] Int. Cl. ............................................ G01b 7/16
[58] Field of Search ........ 73/88.5 R, 141 R, 141 A, 73/1 B, 1 R, DIG. 4; 317/234 P, 123; 85/1 T, 32 T, 62

[56] References Cited
UNITED STATES PATENTS

| 3,248,923 | 5/1966 | Blakeley | 73/1 B |
| 3,315,202 | 4/1967 | Johns et al. | 338/5 |
| 3,482,121 | 12/1969 | Hatschek | 317/234 P |
| 3,612,966 | 10/1971 | Dybel | 317/123 |
| 3,719,862 | 3/1973 | Gaicki | 317/234 P |

FOREIGN PATENTS OR APPLICATIONS

| 396,093 | 7/1933 | Great Britain | 85/1 T |

Primary Examiner—Herbert Goldstein
Assistant Examiner—Stephen A. Kreitman
Attorney, Agent, or Firm—Wegner, Stallman, McCord, Wiles & Wood

[57] ABSTRACT

A piezoelectric transducer for measuring the deformation of a member subject to a load. The piezoelectric transducer is mounted between a pair of spaced brackets with a section of the mounting having a stress/deformation ratio which prevents excessive deformation of the transducer. The brackets are mounted on the member with the line between them, which is at right angles to the transducer, oriented at right angles to the load applied to the member so that the lateral rather than the longitudinal deformation is sensed. The terminals for the piezoelectric transducer are conductive elements engaging the faces of the transducer and have relative length and cross-sectional dimensions such that they bend with lateral forces, minimizing unequal compressive forces across the surface of the transducer.

A slotted mounting bracket is fitted with a shim for accurate adjustment of the prestress load on the transducer.

14 Claims, 7 Drawing Figures

Patented Jan. 7, 1975
3,858,440
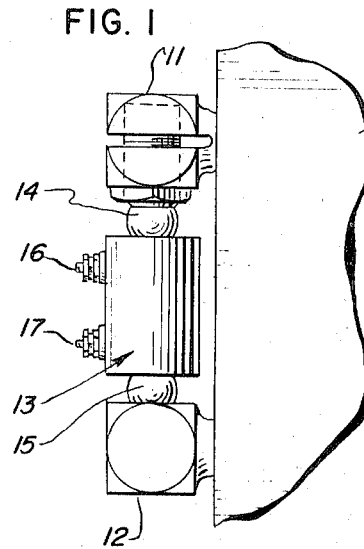
FIG. 1
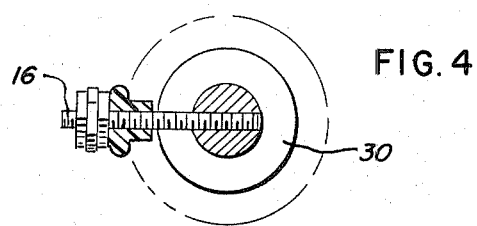
FIG. 4
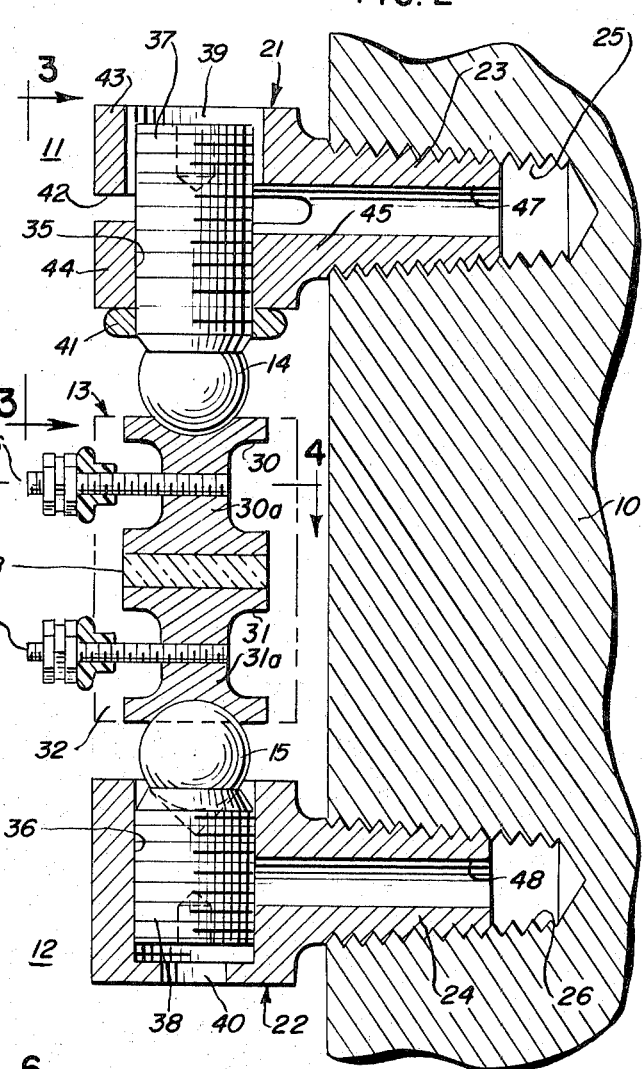
FIG. 2
FIG. 3
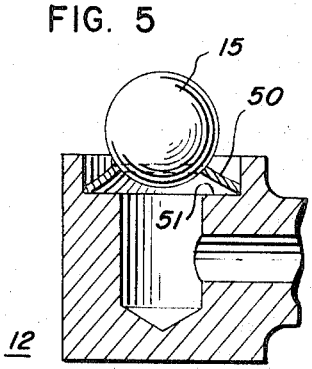
FIG. 5
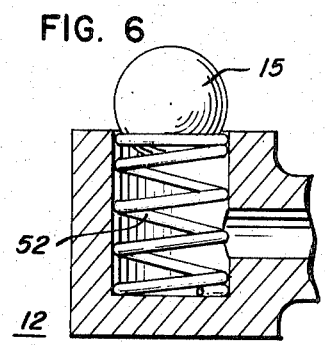
FIG. 6
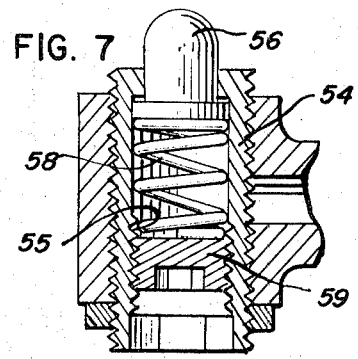
FIG. 7

STRESS TRANSDUCER MOUNTING AND METHOD OF ADJUSTMENT

This invention relates to a mounting for a piezoelectric element used in measuring the deformation of a member subject to a load, as a frame member of a machine. During operation of the machine, as a press, for example, the machine frame members are subjected to forces which may apply a load either in tension or in compression to the member. Detection of the resulting deformation of the member provides an indication of the occurrence of the machine operation and quantitative measurement of the deformation may be utilized to monitor machine operation to give an alarm or shut down the machine if the machine forces vary from the optimum.

A piezoelectric transducer, as a quartz crystal or a ceramic element, is particularly suited for measuring the deformation of a structural member of a machine. A piezoelectric transducer has a high impedance with a voltage output which may readily be amplified if desired or may operate directly a voltage sensitive circuit. A piezoelectric transducer is not subject to characteristic changes with aging, temperature or humidity.

In a typical installation (as shown in U.S. Pat. No. 3,612,966) the piezoelectric transducer has a pair of terminals connected therewith and is mounted between two brackets which are secured to the machine member. The transducer is held under compression. The brackets are aligned with the stress to be measured in the machine member.

Several problems have been found with the prior transducer mounting. First, deformation of the machine element may be so great that the piezoelectric transducer is damaged either by an overload condition or by repeated highlevel stressing. Second, nonuniform application of pressure across the surface of the piezoelectric transducer may cause the edges to crack. Third, the mounting brackets have a tapered threaded portion. When the bracket is screwed into the member, the threads wedge solidly setting up stresses in the bracket which result in the outer end twisting off.

One feature of the invention is the incorporation in the mounting of at least one flexible section with a stress deformation ratio such that the stress actually applied to the transducer element is not excessive.

Another feature is that the means carrying the transducer between the supporting surfaces of the brackets includes an element which has a ratio of length to cross-section such that lateral bending forces between the brackets cause bending of the carrying element and equalize the pressure applied across the surface of the transducer.

A further feature of the invention is that the brackets are mounted on the member with the line between the brackets at an angle to the direction of action of the load on the element, and sense a deformation less than that in the direction of the load.

Yet another feature of the invention is that the mounting bracket has a tapered threaded portion received in a threaded hole in the member, with a bore or hole extending axially therethrough so that the stress in the threaded portion of the bracket compresses the wall of the bracket circumferentially and the concentration of stress which caused the bracket head to twist off is eliminated.

And a further feature is that a shim may be inserted in a slot in the bracket and the mounting adjusted to close the slot on the shim, accurately prestressing the transducer.

Further features and advantages of the invention will readily be apparent from the following specification and from the drawings, in which:

FIG. 1 is a fragmentary view of a machine element illustrating a preferred embodiment of the transducer mounting;

FIG. 2 is an enlarged sectional view through the transducer mounting;

FIG. 3 is a fragmentary view of one mounting bracket taken along line 3—3 of FIG. 2;

FIG. 4 is a sectional view taken along line 4—4 of FIG. 2;

FIG. 5 is a fragmentary sectional view of a modification of one portion of the mounting;

FIG. 6 is a view similar to FIG. 5 of another modification of a portion of the mounting; and FIG. 7 is a view similar to FIG. 5 of a further modification of a portion of the mounting.

In FIG. 1, deformation is to be measured of a member 10 which may be an element of the frame of a press, for example. Brackets 11 and 12 are secured to the member 10 and an encapsulated piezoelectric transducer 13 is carried by balls 14 and 15 between the brackets. The signal developed in the transducer element appears at terminal connectors 16 and 17 which may be connected with suitable recording or indicating circuitry. A preferred embodiment of the invention is illustrated in FIGS. 2–4. Brackets 11 and 12 each have a head 21, 22 and a threaded shank portion 23, 24 received in tapped holes 25, 26 in member 10.

Piezoelectric transducer element 28, which may be either quartz or a ceramic material, is a thin disc preferably of circular cross-section and having parallel faces across which a voltage is developed when the element is subjected to mechanical stress. Conductive terminal elements 30, 31 each have an end which engages a face of piezoelectric element 28 and is co-extensive therewith. The opposite ends of terminals 30, 31 are recessed to receive balls 14 and 15 which are of a nonconductive material, as a ceramic electrically isolating the transducer from member 10. Terminal connectors 16, 17 are threaded into terminals 30, 31 at an intermediate point. The transducer assembly, including the transducer element 28, terminals 30, 31 and connectors 16, 17, is encapsulated in a protective body 32 of plastic.

The heads 21, 22 of brackets 11, 12 each have therein a threaded bore 35, 36 in which mounting screws 37, 38 are received, engaging balls 14, 15 and carrying the transducer assembly 13 between the brackets. Screws 37, 38 are adjustable through open ends 39, 40 of bracket heads 21, 22. Lock nut 41 secures the screw 37 in position.

Brackets 11 and 12 are spaced apart on member 10 along a line which is parallel to the direction of the deformation to be measured. Piezoelectric transducer 13 is carried between the brackets and is initially subjected to a compressive prestress force by adjustment of screws 37, 38. If the transducer is to measure a compression deformation in the sensing direction in member 10, a minimal prestress is required in sensing element 28. If, however, the deformation to be measured is one of extension of the dimension of member 10, the prestress load on the sensing element must be such that it remains under minimal compression for all conditions of member 10 which may be encountered.

The stress in the frame member of a large press may result in deformation of as much as 500 microinches per inch. In a representative installation the mounting brackets 11 and 12 may be spaced apart about 3 inches to accommodate the piezoelectric transducer, terminals and other structure, as balls 14 and 15, by which the transducer is carried. The transducer assembly may be subjected to a deformation of 1,500 microinches. If this entire deformation or even a substantial part of it were transmitted directly to the piezoelectric transducer, it would be damaged.

In accordance with the invention, the mounting for the piezoelectric transducer includes one or more resilient sections which accommodate a substantial portion of the deflection of the member so that only a part thereof is transmitted to the piezoelectric transducer element. The head 21 of bracket 11 has a slot 42 therethrough extending at right angles to the direction of the deformation to be measured and dividing bracket head 21 into two portions 43 and 44. Transducer mounting screw 37 is threaded only into the bore 35 in bracket head portion 44, which is between slot 42 and the other mounting bracket 12. The interconnection of the transducer with member 10 is through the reduced bracket section 45 between head portion 44 and the threaded mounting portion 23. Section 45 will flex in a linear manner with deformation of member 10 and only a portion of the deformation is transmitted to piezoelectric element 28. If member 10 is subjected to a compressive force in the direction of the line between brackets 11, 12, bracket portion 44 is flexed toward portion 43. A large deformation may close slot 42 causing bracket portion 44 to abut portion 43. This will result in an increase in the output of the transducer and a different stress to signal ratio, but provides a safety factor so that the bracket is not readily broken. Bracket 12 could be slotted in a similar manner if desired. The stress/deformation ratio of the slotted bracket is preferably less than that of member 10.

Additional resilience in the mounting is provided by the terminals 30, 31. Both are conductive and preferably of metal. The end faces which engage the piezoelectric element 28 are coextensive with the element. The central sections 30a, 31a of the terminals are of a lesser cross-section so that the stress/deformation ratio of the terminals is less than it would be if the terminals were cylinders of the diameter of transducer element 28. Terminals 30, 31 are preferably of metal, but need not be of steel, the usual material for member 10. Rather, a material having a smaller stress/deformation ratio may be used, as brass or aluminum, for example.

The slotted bracket 11 and the selection of the material and the design of the cross-section of terminals 30, 31 provide a mounting for transducer element 28 which has sufficient resilience to deflect upon deformation of member 10 so that only a portion of the deformation is transmitted to the transducer element. In a typical installation only 15 to 20 percent of the deformation of member 10 is transmitted to the transducer element, the remainder being accommodated in the linear resilience of the mounting.

The sensing element 28 may be capable of withstanding a deformation of 200 microinches. If the portion of the machine member 10 between brackets 11, 12 has a deformation of 600 microinches, 400 microinches must be absorbed in the mounting. The stress/deformation ratio of the mounting (i.e., brackets and terminals) may be determined from the physical characteristics of the sensing element and the machine member.

The configuration of terminals 30, 31 has an additional advantage. The force between the opposed supporting surfaces of brackets 11, 12 upon deformation of member 10 is sometimes not precisely at right angles to the faces of transducer 28. This results in an unequal distribution of the pressure across the transducer surface with the creation of excessive pressure at one edge. The ratio of length to crosssection of terminals 30, 31 is such that lateral bending forces between the brackets cause bending of the terminal elements, minimizing unequal compressive loads on the transducer 28. This effect can be increased by increasing the length or further reducing the central cross-section of the terminals.

The slotted bracket may be utilized to establish an accurate prestress on the sensing element. A shim, not shown, of appropriate thickness is inserted in the bracket slot 42. Mounting screw 37 is tightened to close up the space between the slot wall and the shim. The shim is then removed. This procedure is more reliable than the past practice of adjusting the mounting screw with a torque wrench, since the torque is dependent on other variables as the thread tolerances and surface conditions.

The threads on the mounting portions 23 and 24 of brackets 11 and 12 are preferably tapered and the tapped bores 25, 26 in which they are received have a complementary taper. As the brackets are threaded into the member 10, the threads wedge together and leave no clearance. In the past, the mounting portion of the bracket has been a solid member. The stresses set up as the thread is turned into the tapped hole have a tendency to cause the head of the bracket to twist off. In accordance with the present invention, the threaded mounting portions of the brackets have an axial bore 47, 48 therethrough. The stresses set up in the brackets as the tapered threads wedge together are reflected in circumferential stresses which tend to compress the bracket mounting portions 23, 24 reducing the size of bores 47, 48, and reducing the tendency of the bracket heads 21, 22 to twist off.

The deformation of the sensing element 28 for a unit deformation of member 10 may further be reduced by mounting the transducer at an angle to the direction in which the load is applied to member 10. For example, if a member is subjected to a compressive load, the dimension in the direction of the load is reduced. At the same time, the dimension at right angles to the direction of the load is increased, but to a lesser degree. This effect, commonly referred to as Poisson's ratio, is such that the deformation of a steel member at right angles to the load is about one-third that of the deformation in the direction of the load. Thus, to take advantage of this characteristic, the member 10 of FIG. 2 might have the force acting thereon in a direction at right angles to the surface of the paper. Then the unit deformation along the line between brackets 11 and 12 is only one-third the unit deformation of the member.

FIGS. 5, 6 and 7 show other transducer mountings which may be utilized to provide resilience which reduces the deformation of the transducer. In FIG. 5 mounting screw 38 is replaced by a resilient washer 50 resting on the surface 51 of bracket 12 and supporting ball 15. In FIG. 6 mounting screw 38 is replaced by a coiled compression spring which supports ball 15. A commercially available screw 54 with a threaded bore 55 therethrough is used in the mounting of FIG. 7. Plunger 56 is held against the transducer element terminal by spring 58. The pressure is adjusted by screw 59.

I claim:

1. A mounting for a piezoelectric transducer which measures the deformation of a member subject to a load, comprising:

a pair of brackets secured to said member and having facing supporting surfaces spaced apart along a line parallel with the deformation to be measured; and means carrying the piezoelectric transducer between the supporting surfaces of the brackets, including a resilient conical washer interposed between one of said brackets and said transducer having a stress-deformation ratio which is less than that of said member, and which deflects on deformation of said member, whereby only a portion of the deformation of the member is transmitted to the piezoelectric transducer and the force exerted on the transducer is less than that corresponding to the deformation of the member.

2. A mounting for a piezoelectric transducer which measures the deformation of a member subject to a load, comprising:

a pair of brackets secured to said member and having facing supporting surfaces spaced apart along a line parallel with the deformation to be measured; and means carrying the piezoelectric transducer between the supporting surfaces of the brackets, including a spring interposed between one of said brackets and said transducer having a stress-deformation ratio which is less than that of said member, and which deflects on deformation of said member, whereby only a portion of the deformation of the member is transmitted to the piezoelectric transducer and the force exerted on the transducer is less than that corresponding to the deformation of the member.

3. A mounting for a piezoelectric transducer which measures the deformation of a member subject to a load, comprising:

a pair of brackets secured to said member and having facing supporting surfaces spaced apart along a line parallel with the deformation to be measured; and means carrying the piezoelectric transducer between the supporting surfaces of the brackets to transmit a compressive force from the member to the piezoelectric transducer, one of the brackets having a head with a slot therethrough generally at right angles to said line parallel with the deformation to be measured, dividing the bracket head into two portions, the supporting surface for the piezoelectric transducer being in only one portion which is resilient and deflects on deformation of the member, whereby only a portion of the deformation of the member is transmitted to the piezoelectric transducer and the force exerted on the transducer is less than that corresponding to the deformation of the member.

4. The mounting of claim 3 in which the supporting surface for the piezoelectric transducer is in the portion of said one bracket intermediate the slot and the other bracket.

5. The mounting of claim 4 in which a load on the bracket causes the bracket portion with the supporting surface to deflect toward the other portion of the bracket.

6. The mounting of claim 3 in which said piezoelectric transducer carrying means includes a screw threaded to the bracket portion.

7. A mounting for a piezoelectric transducer which measures the deformation of a member subject to a load, comprising:

a pair of brackets secured to said member and having facing supporting surfaces spaced apart along a line parallel with the deformation to be measured; and means carrying the piezoelectric transducer between the supporting surfaces of the brackets, including a pair of electrically conductive terminal elements one on either side of the piezoelectric transducer and each interposed between the transducer and the adjacent bracket to transmit a compressive force from the member to the piezoelectric transducer and to derive an electrical signal therefrom, at least one of the terminal elements being resilient to deflect on deformation of said member, having a stress/deformation ratio which is less than that of said member, whereby only a portion of the deformation of the member is transmitted to the piezoelectric transducer.

8. The mounting of claim 7 in which each of the terminal elements has a stress/deformation ratio less than that of the loaded member.

9. The mounting of claim 7 in which said one terminal element has an end surface coextensive with a surface of the piezoelectric transducer and an intermediate section of lesser cross section.

10. A mounting for a piezoelectric transducer which measures the deformation of a member subject to a load, comprising:

a pair of brackets secured to said member and having facing supporting surfaces spaced apart along a line parallel with the deformation to be measured; and means carrying the piezoelectric transducer between the supporting surfaces of the brackets, said carrying means including an element on at least one side of said piezoelectric transducer to transmit a force from the member to the transducer and which has a ratio of length to cross-section such that lateral bending forces between the brackets cause bending of the element and minimize unequal compressive loads across the surface of the piezoelectric transducer.

11. The mounting of claim 10 in which an element on each side of said piezoelectric transducer has such a ratio of length to cross-section.

12. The mounting of claim 10 in which said element is an electrically conductive terminal means having an end surface coextensive with the surface of said piezoelectric transducer and an intermediate portion of lesser cross-section.

13. The mounting of claim 12 in which the stress/deformation ratio of the electrical terminal means is less than that of the member.

14. A mounting for a piezoelectric transducer which measures the deformation of a member subjected to a load, comprising:

a pair of brackets each having a tapered threaded portion received in a tapered threaded hole in said member, said tapered threaded portion having an axial bore therethrough, said bore being at least co-extensive with the threads on said bracket portion and the diameter of said bore being of the order of one-half the diameter of said threaded portion, stress in the threaded portion of the bracket caused by wedging of the tapered threads into the hole in said member compressing the wall of the bracket portion circumferentially.

* * * * *